United States Patent
Troberg et al.

(10) Patent No.: US 9,828,929 B2
(45) Date of Patent: Nov. 28, 2017

(54) CONTROL METHOD FOR AN INTERNAL COMBUSTION ENGINE AND INTERNAL COMBUSTION ENGINE

(75) Inventors: Mikael Troberg, Trieste (IT); Luca Zuanigh, Trieste (IT); Anton Wintersteller, Trieste (IT); Christer Hattar, Vasa (FI); Gino Rizzetto, Trieste (IT); Diego Delneri, Vaasa (FI)

(73) Assignee: WARTSILA FINLAND OY, Vaasa (FI)

( * ) Notice: Subject to any disclaimer, the term of this patent is extended or adjusted under 35 U.S.C. 154(b) by 893 days.

(21) Appl. No.: 13/991,095

(22) PCT Filed: Oct. 12, 2011

(86) PCT No.: PCT/FI2011/050879
§ 371 (c)(1),
(2), (4) Date: Oct. 28, 2013

(87) PCT Pub. No.: WO2012/072864
PCT Pub. Date: Jun. 7, 2012

(65) Prior Publication Data
US 2014/0041637 A1 Feb. 13, 2014

(30) Foreign Application Priority Data
Dec. 1, 2010 (FI) .................................... 20106271

(51) Int. Cl.
*F02D 41/32* (2006.01)
*F02D 13/02* (2006.01)
(Continued)

(52) U.S. Cl.
CPC ............ *F02D 41/32* (2013.01); *F02D 13/02* (2013.01); *F02D 41/0002* (2013.01);
(Continued)

(58) Field of Classification Search
CPC ...... F02D 41/32; F02D 13/02; F02D 41/0002; F02D 41/3017; F02D 41/3094;
(Continued)

(56) References Cited

U.S. PATENT DOCUMENTS 6,125,801 A * 10/2000 Mendler .................. F01L 1/34
123/48 R
6,422,199 B1 * 7/2002 Buckley ............... F02M 45/086
123/299
(Continued)

FOREIGN PATENT DOCUMENTS

DE 10 2008 001111 A1 10/2009
EP 0 972 932 A1 1/2000
EP 1 321 662 A1 6/2003

*Primary Examiner* — Thomas Moulis
*Assistant Examiner* — John Bailey
(74) *Attorney, Agent, or Firm* — Muncy, Geissler, Olds & Lowe PC

(57) ABSTRACT

The method for controlling the operation of an internal combustion engine comprises at least two operating modes. In a first operating mode, the intake valve is closed at a first predetermined crank angle, in accordance with the Miller cycle, before the piston reaches bottom dead center during the intake stroke for reducing pressure in the cylinder, and fuel is injected using first fuel injection means optimized for large amounts of fuel. In a second operating mode the intake valve is closed at a second predetermined crank angle, in accordance with conventional intake valve closing timing, after or slightly before the piston has passed bottom dead center, and fuel is injected using second fuel injection means optimized for small amounts of fuel. The invention also concerns an internal combustion engine.

13 Claims, 1 Drawing Sheet

(51) Int. Cl.
F02D 41/00 (2006.01)
F02D 41/30 (2006.01)
F02D 41/40 (2006.01)
F02M 45/08 (2006.01)

(52) U.S. Cl.
CPC ..... F02D 41/3017 (2013.01); F02D 41/3094 (2013.01); F02D 41/40 (2013.01); F02M 45/086 (2013.01); F02M 2200/44 (2013.01); Y02T 10/142 (2013.01); Y02T 10/18 (2013.01); Y02T 10/42 (2013.01); Y02T 10/44 (2013.01)

(58) Field of Classification Search
CPC .. F02D 41/40; F02D 13/0223; F02D 13/0226; F02D 15/04; F02D 2041/001; F02D 41/26; F02D 41/3005; F02D 41/3011; F02D 41/3064; F02D 41/3076; F02D 2250/36; F02D 2250/38; F02D 2700/0207; F02D 2700/021; F02D 2700/0212; F02D 2700/03; F02D 2700/035; F02M 45/086; F02B 1/06; F02B 3/08; F02B 41/02; F02B 41/04; F02B 41/06; F02B 41/08; F02B 2275/00; F02B 2275/32
USPC .......... 123/478, 681, 90.15–90.17, 304–305, 123/299–300
See application file for complete search history.

(56) References Cited

U.S. PATENT DOCUMENTS

| | | | | |
|---|---|---|---|---|
| 6,655,349 B1* | 12/2003 | Cavanagh | F01L 1/181 | 123/321 |
| 7,100,552 B2* | 9/2006 | Bloms | F01L 9/023 | 123/320 |
| 7,201,121 B2* | 4/2007 | Weber | F01L 9/02 | 123/559.1 |
| 7,331,317 B2* | 2/2008 | Yasui | F01L 1/022 | 123/347 |
| 7,415,966 B2* | 8/2008 | Irisawa | F02D 13/0226 | 123/326 |
| 7,484,498 B2* | 2/2009 | Hitomi | F02D 13/0223 | 123/316 |
| 7,527,028 B2* | 5/2009 | Leone | B60W 10/06 | 123/348 |
| 7,556,017 B2* | 7/2009 | Gibson | F02M 47/027 | 123/299 |
| 7,753,036 B2* | 7/2010 | Lents | F01C 1/22 | 123/559.1 |
| 7,765,966 B2* | 8/2010 | Leone | B60K 6/24 | 123/90.15 |
| 8,186,330 B2* | 5/2012 | Kobayashi | F01L 1/143 | 123/406.29 |
| 8,316,827 B2* | 11/2012 | Miyamoto | F02D 11/105 | 123/559.1 |
| 8,453,625 B2* | 6/2013 | Groenendijk | F02D 13/0276 | 123/568.12 |
| 8,459,576 B2* | 6/2013 | Kim | F02D 19/0647 | 123/299 |
| 8,662,042 B2* | 3/2014 | Kamio | F01L 1/34 | 123/90.17 |
| 9,217,378 B2* | 12/2015 | Kamio | F02D 13/0223 | |
| 2001/0003976 A1* | 6/2001 | Lehtonen | F02M 47/043 | 123/467 |
| 2002/0007816 A1* | 1/2002 | Zur Loye | F02B 1/12 | 123/295 |
| 2002/0013653 A1* | 1/2002 | Ohyama | F01L 13/0036 | 701/103 |
| 2002/0148421 A1* | 10/2002 | Wiekmeijer | F01L 1/34 | 123/90.12 |
| 2003/0098371 A1* | 5/2003 | Brenk | F02M 45/086 | 239/533.3 |
| 2003/0196641 A1* | 10/2003 | Ashida | F02B 17/00 | 123/432 |
| 2003/0213462 A1* | 11/2003 | Weber | F01L 13/0015 | 123/305 |
| 2005/0229900 A1* | 10/2005 | Weber | F01N 3/2073 | 123/316 |
| 2005/0229901 A1* | 10/2005 | Weber | F01L 9/02 | 123/316 |
| 2005/0235950 A1* | 10/2005 | Weber | F01L 1/34 | 123/299 |
| 2005/0235953 A1* | 10/2005 | Weber | F01N 3/035 | 123/316 |
| 2005/0241302 A1* | 11/2005 | Weber | F01L 13/0015 | 60/311 |
| 2005/0241611 A1* | 11/2005 | Weber | F01L 1/181 | 123/299 |
| 2005/0247284 A1* | 11/2005 | Weber | F01L 13/0015 | 123/299 |
| 2005/0279329 A1* | 12/2005 | Pierpont | F02D 13/0226 | 123/478 |
| 2006/0201152 A1* | 9/2006 | Irisawa | F02D 13/0226 | 60/605.1 |
| 2007/0023005 A1* | 2/2007 | Chmela | F02B 23/0669 | 123/305 |
| 2007/0089706 A1* | 4/2007 | Weber | F01L 13/0015 | 123/316 |
| 2007/0220884 A1* | 9/2007 | Savage, Jr. | F02B 37/02 | 60/602 |
| 2007/0246561 A1 | 10/2007 | Gibson | | |
| 2007/0256665 A1* | 11/2007 | Sun | F02D 19/081 | 123/431 |
| 2008/0053408 A1* | 3/2008 | Futonagane | F02D 41/2096 | 123/456 |
| 2008/0121218 A1* | 5/2008 | Algrain | F02B 37/013 | 123/565 |
| 2008/0319638 A1* | 12/2008 | Yasui | F01L 13/0021 | 701/105 |
| 2009/0222194 A1* | 9/2009 | Bowman | F02D 13/0269 | 701/103 |
| 2009/0314264 A1* | 12/2009 | Takahashi | F01L 1/3442 | 123/568.11 |
| 2010/0000478 A1* | 1/2010 | Yoshikawa | F02N 19/004 | 123/90.15 |
| 2010/0154757 A1* | 6/2010 | Miyamoto | F02D 11/105 | 123/559.1 |
| 2010/0269783 A1* | 10/2010 | Hergart | F02M 45/086 | 123/295 |
| 2011/0307159 A1* | 12/2011 | Nakasaka | F02D 13/0215 | 701/102 |
| 2011/0315101 A1* | 12/2011 | Cleary | F02D 13/0207 | 123/90.15 |
| 2012/0048218 A1* | 3/2012 | Klingbeil | F02D 13/0269 | 123/90.1 |
| 2012/0160213 A1* | 6/2012 | Vijayaraghavan | F02B 17/00 | 123/445 |
| 2012/0187218 A1* | 7/2012 | Kim | F02D 19/105 | 239/417.5 |
| 2013/0298888 A1* | 11/2013 | Fiveland | F02B 33/22 | 123/70 R |
| 2013/0312708 A1* | 11/2013 | Kuriyama | F02D 41/00 | 123/478 |

* cited by examiner

CONTROL METHOD FOR AN INTERNAL COMBUSTION ENGINE AND INTERNAL COMBUSTION ENGINE

TECHNICAL FIELD OF THE INVENTION

The present invention relates to a method for controlling the operation of an internal combustion engine in accordance with the preamble of claim 1. The invention also concerns an internal combustion engine, as defined in the preamble of claim 13.

BACKGROUND OF THE INVENTION

In large compression ignition internal combustion engines, such as those used in ships or power plants, smoke formation at low loads is a common problem. The fuel injectors of the engines must be capable of delivering the fuel amount needed for the operation at maximum load. Since large internal combustion engines need to run reliably and efficiently at maximum or near maximum power, the injectors are even optimized for high loads. This means that at low loads the injectors do not work optimally and smoke is formed.

The problem has been solved in prior art solutions by using injectors with two needles. For instance, in European patent application EP 0972932 A1 is disclosed a fuel injector comprising several nozzle drillings. For a part load operation, only the outer valve needle is moved for revealing nozzle drillings in an upper region. For higher load, also the inner valve needle is moved for revealing nozzle drillings in a lower region.

In patent application US 2007246561 A1 is described a fuel injector comprising two nozzles that are configured for providing different fuel spray patterns. One of the nozzles is optimized for conventional injection, whereas the other nozzle is optimized for use with homogeneous charge compression ignition (HCCI).

Another problem of internal combustion engines is NOx formation, which occurs especially at high combustion temperatures. NOx emissions can be removed effectively from the exhaust gases with selective catalytic reduction, but it is desirable to be able to reduce the NOx formation already in the first place. NOx formation can be best reduced by lowering cylinder temperatures. One way of doing this is to apply the so called Miller cycle, which utilizes modified intake valve closing process. There are two versions of the Miller cycle: In the first version, the intake valve is closed only after bottom dead center (BDC), which means that part of the compression stroke is not used for compression. This is often used in spark ignition engines to achieve higher thermal efficiency and a lower tendency to knocking. In the other version of the Miller cycle, early closing of the intake valve is utilized. When the intake valve is closed before the piston arrives at bottom dead center, pressure and temperature in the cylinder will be lower at the end of the compression stroke. This version of the Miller cycle is often used in compression ignition engines. The smaller amount of air in the cylinder due to the early closing of the intake valve is usually compensated by an adequate supercharge ratio.

However, at part and low loads the use of the Miller cycle increases NOx emissions. Also, the optimal Miller cycle with respect to the NOx emissions gives higher smoke emissions. Also the specific fuel oil consumption (SFOC) is higher at low loads if the Miller cycle is used.

SUMMARY OF THE INVENTION

The object of the present invention is to provide an improved method for controlling the operation of an internal combustion engine. Another object of the invention is to provide an improved internal combustion engine. The characterizing features of the invention are given in the characterizing parts of claims 1 and 13.

According to the present invention, a method for controlling the operation of an internal combustion engine comprises at least two operating modes. The engine comprises at least one cylinder, a reciprocating piston arranged inside the cylinder, at least one intake valve arranged in connection with the cylinder, first fuel injection means, second fuel injection means optimized for injecting smaller amounts of fuel than the first fuel injection means and means for variable intake valve closing. In a first operating mode the intake valve is closed at a first predetermined crank angle, in accordance with the Miller cycle, before the piston reaches bottom dead center during the intake stroke for reducing pressure in the cylinder, and fuel is injected using the first fuel injection means. In a second operating mode the intake valve is closed at a second predetermined crank angle, in accordance with conventional intake valve closing timing, after or slightly before the piston has passed bottom dead center, and fuel is injected using the second fuel injection means.

The invention has several advantages. The Miller cycle is effective in reducing NOx emissions and controlling firing pressure at high loads, but leads to higher smoke emissions. According to the invention, the Miller cycle is utilized only when its benefits outweigh the drawbacks. The use of different fuel injection means for different amounts of fuel together with the selective use of the Miller cycle gives very low smoke emissions, while also the NOx emissions and SFOC can be minimized and exhaust temperature optimized.

According to an embodiment of the invention, the method comprises a third operating mode, in which mode conventional intake valve closing timing is used and fuel is injected using the first fuel injection means. This operating mode can be used at part load. Because of the conventional intake valve closing timing the smoke emissions can be kept low. With the first fuel injection means sufficient amount of fuel can be injected into the cylinder.

According to an embodiment of the invention, the method comprises a fourth operating mode, in which mode the Miller cycle is used and fuel is injected using the second fuel injection means. In this operating mode, very low NOx emissions can be achieved at relatively low loads. Also the temperature after the turbine of the turbocharger can be increased significantly, which enables selective catalytic reduction.

According to an embodiment of the invention, in the fourth operating mode later intake valve closing timing is used than in the first operating mode. According to an embodiment of the invention, the intake valve is closed 5-15 degrees of crank angle later. At high loads, earlier intake valve closing helps to lower SFOC and NOx emissions.

According to an embodiment of the invention, the method comprises a fifth operating mode, in which mode the Miller cycle with later intake valve closing timing than in the first operating mode is used and fuel is injected using the first fuel injection means. According to an embodiment of the invention, the intake valve is closed 5-15 degrees of crank angle later. With this operating mode, low SFOC can be achieved at medium to high engine loads together with relatively low NOx and smoke emissions.

According to an embodiment of the invention, in the first operating mode earlier intake valve opening timing is used than in the other operating modes. Earlier intake valve opening reduces the surging risk of the turbocharger when the Miller cycle with very early intake valve closing is used. According to an embodiment of the invention, in the first operating mode the intake valve is opened 10-30 degrees earlier than in the other operating modes.

According to an embodiment of the invention, when the Miller cycle is used, the intake valve is closed 15-70 degrees of crank angle before bottom dead center. According to another embodiment of the invention, the intake valve is closed 20-40 degrees of crank angle before bottom dead center.

According to an embodiment of the invention, fuel is injected using an injector comprising two needles.

An internal combustion engine according to the present invention comprises at least one cylinder, a reciprocating piston arranged inside the cylinder, at least one intake valve arranged in connection with the cylinder, means for variable intake valve closing, first fuel injection means, second fuel injection means optimized for injecting smaller amounts of fuel than the first fuel injection means, and control means for controlling the valve closing means and the fuel injection means. The control means is arranged to execute the method described above.

According to an embodiment of the invention, the engine comprises means for variable inlet opening.

DETAILED DESCRIPTION OF THE INVENTION

The invention is now described in more detail with reference to the accompanying drawings and tables.

Figure 1:
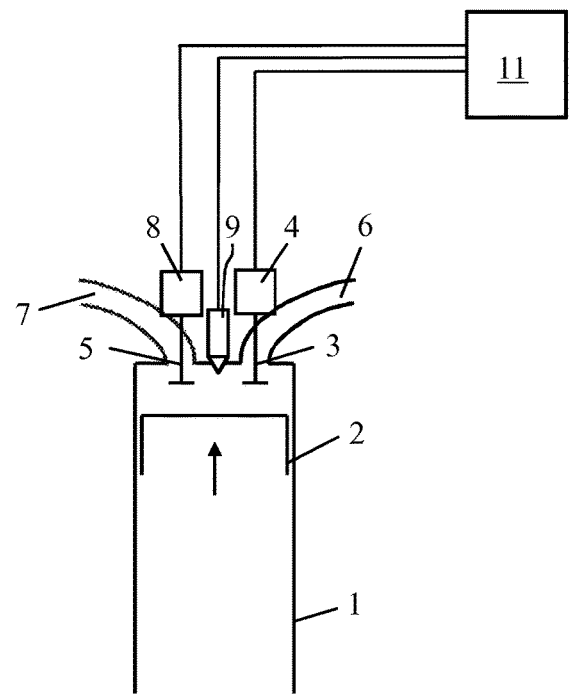
FIG. 1 shows schematically a cylinder of an internal combustion engine.

In FIG. 1 is shown a cylinder 1 of an internal combustion engine. The engine can comprise any reasonable number of cylinders 1 arranged for instance in-line or in a V-configuration. A reciprocating piston 2 is arranged inside the cylinder 1. Intake air can be introduced into the cylinder 1 via an intake air channel 6. The connection between the cylinder 1 and the intake air channel 6 is closable by an intake valve 3. Means 4 for closing and opening the intake valve 3 are arranged in connection with the valve 6. The closing and opening means 4 can be for instance a hydraulic or electrical actuator, or a mechanical camshaft-guided device. The engine also comprises an exhaust channel 7 and an exhaust valve 5 for opening and closing the connection between the cylinder 1 and the exhaust channel 7. Means 8 for closing and opening the exhaust valve 5 are arranged in connection with the valve 5. The closing and opening means 8 can be a similar hydraulic or electrical actuator or a mechanical camshaft-guided device as the means 4 for closing and opening the intake valve 3. A fuel injector 9 is arranged in the cylinder head for injecting fuel into the cylinder 1. The valve opening and closing means 4, 8 and the fuel injector 9 are controlled by a control unit 11.

Figure 2:
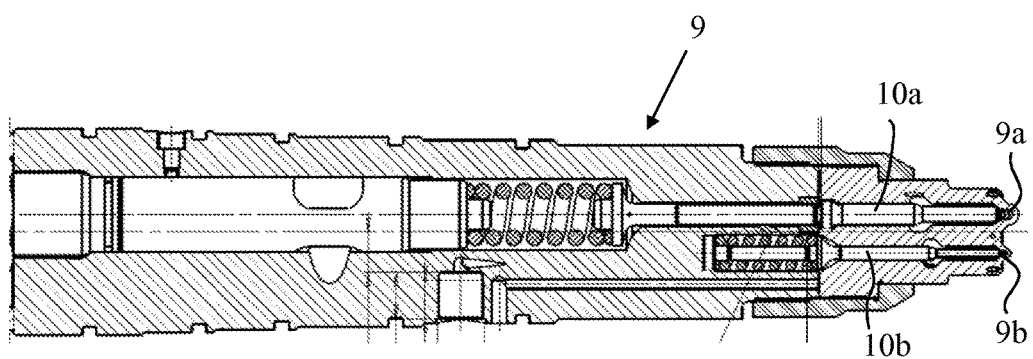
FIG. 2 shows a fuel injector of an internal combustion engine.

In FIG. 2 is shown an example of a fuel injector 9. The fuel injector 9 comprises two nozzles 9a, 9b. The first nozzle 9a is suitable for injecting fuel amounts that are large in relation to the fuel amounts that are injected when the engine is operated at the maximum load. The first nozzle 9a can thus be used when the engine is operated at high or intermediate loads, for instance when the engine load is 35-100 percent of the maximum load. The second nozzle 9b is suitable for injecting fuel amounts that are small in relation to the fuel amounts that are injected when the engine is operated at the maximum load. The second nozzle 9b can thus be used when the engine is operated at low loads, for instance when the load is less than 35 percent of the maximum load.

The fuel injector comprises a first spring loaded needle 10a and a second spring loaded needle 10b. The needles 10a, 10b can be moved hydraulically for letting the fuel flow to the nozzles 9a, 9b.

The method according to the present invention comprises at least two operating modes, which are used at different engine loads. According to an embodiment of the invention, the method comprises two operating modes, as shown in table 1.

TABLE 1

Control strategy according to an embodiment of the invention.

|  |  | Engine load | |
| --- | --- | --- | --- |
|  |  | 0-35% 2. mode | 35-100% 1. mode |
| Valve timing | No Miller Miller cycle | X | X |
| Injection needle | Small needle Large needle | X | X |

The first operating mode is optimized for higher engine loads and the second operating mode for lower loads. In the embodiment of table 1, the first operating mode is used at loads that are 35-100% of the maximum load of the engine, i.e. from part loads to high loads. In the first operating mode, the Miller cycle with early intake valve closing is used. The intake valve 3 can be closed for instance 20-40 degrees of crank angle before bottom dead center. The closing crank angle refers to that angle at which the valve 3 is completely closed. With the use of the Miller cycle low SFOC and NOx emissions are achieved. When the engine is operated at a high load, a large injection area is needed for achieving sufficient fuel injection rate. Therefore, fuel is injected into the cylinders 1 of the engine through the first nozzle 9a by moving the first needle 10a of the fuel injector 9. In practice, small fuel flow is periodically allowed also through the second nozzle 9b. The same applies to the other operating modes. This flushing that is done according to scheduled time intervals prevents sticking of the second needle 10b.

The second operating mode is optimized for low or very low loads, in the embodiment of table 1 for loads that are 0-35% of the maximum load. In the second operating mode, variable inlet closing (VIC) is utilized and conventional intake valve closing timing is used instead of the Miller cycle. The intake valve 3 is closed after the piston 2 has passed bottom dead center, for instance 0-20 degrees of crank angle after BDC, or slightly before BDC, for instance 0-5 degrees of crank angle before BDC. At low loads, lower smoke emissions can be achieved with conventional valve timing than with the Miller cycle. Also the SFOC can be minimized when conventional intake valve closing timing is used. Fuel is injected into the cylinders 1 of the engine by using the second nozzle 9b. In practice, small fuel flow is periodically allowed also through the first nozzle 9a for preventing sticking of the first needle 10a. The same applies to the other operating modes.

According to a second embodiment of the invention, the method comprises a third operating mode that is used at part loads, as shown in table 2. In the embodiment of table 2, the third operating mode is used at loads that are 35-50% of the maximum load. Accordingly, the first operating mode is used at loads that are 50-100% of the maximum load, i.e. from intermediate to high loads.

TABLE 2

Control strategy according to a second embodiment of the invention.

| | | Engine load | | |
|---|---|---|---|---|
| | | 0-35% 2. mode | 35-50% 3. mode | 50-100% 1. mode |
| Valve timing | No Miller | X | X | |
| | Miller cycle | | | X |
| Injection needle | Small needle | X | | |
| | Large needle | | X | X |

In the third operating mode, the Miller cycle is not used. Instead, conventional intake valve closing timing is used for achieving low smoke emissions. Fuel is injected into the cylinders 1 of the engine by using the first nozzle 9a.

According to a third embodiment of the invention, the method comprises a fourth operating mode that is used at low loads, as shown in table 3. In the embodiment of table 3, the fourth operating mode is used at loads that are 15-35% of the maximum load. Accordingly, the second operating mode is used at loads that are 0-15% of the maximum load, i.e. at very low loads.

TABLE 3

Control strategy according to a third embodiment of the invention.

| | | Engine load | | | |
|---|---|---|---|---|---|
| | | 0-15% 2. mode | 15-35% 4. mode | 35-50% 3. mode | 50-100% 1. mode |
| Valve timing | No Miller | X | | X | |
| | Miller cycle | | X | | X |
| Injection needle | Small needle | X | X | | |
| | Large needle | | | X | X |

In the fourth operating mode, fuel is injected into the cylinders 1 of the engine by using the second nozzle 9b for achieving low smoke emissions. The Miller cycle is used for achieving low NOx emissions.

According to a fourth embodiment of the invention, the method comprises a fifth operating mode that is used at intermediate loads, as shown in table 4. In the embodiment of table 4, the fourth operating mode is used at loads that are 50-85% of the maximum load. Accordingly, the first operating mode is used at loads that are 85-100% of the maximum load, i.e. at high loads. The fifth operating mode gives low NOx emissions and SFOC at intermediate loads.

TABLE 4

Control strategy according to a fourth embodiment of the invention.

| | | Engine load | | | | |
|---|---|---|---|---|---|---|
| | | 0-15% (very low) 2. mode | 15-35% (low) 4. mode | 35-50% (part) 3. mode | 50-85% (interme- diate) 5. mode | 85- 100% (high) 1. mode |
| VIC ON | No Miller | X | | X | | |
| | Inter. miller | | X | | X | |

TABLE 4-continued

Control strategy according to a fourth embodiment of the invention.

| | | Engine load | | | | |
|---|---|---|---|---|---|---|
| | | 0-15% (very low) 2. mode | 15-35% (low) 4. mode | 35-50% (part) 3. mode | 50-85% (interme- diate) 5. mode | 85- 100% (high) 1. mode |
| VIC OFF | Full Miller | | | | | X |
| VIO ON | Long overlap | | | | | X |
| Injection needle | Small needle | X | X | | | |
| | Large needle | | | X | X | X |

Another difference between the embodiment of table 4 and the embodiments of tables 1-3 is that in the embodiment of table 4, the Miller cycle of the first operating mode is different from the Miller cycles of the other operating modes. In the fourth and fifth operating modes the intake valve 3 is closed later than in the first operating mode. When extreme Miller cycle is used for controlling the firing pressure instead of an exhaust waste gate at high loads, low SFOC and NOx emissions are achieved. In the first operating mode, the intake valve 3 can be closed for instance 20-40 degrees of crank angle before BDC, and in the fourth and fifth operating modes 5-15 degrees of crank angle later than in the first operating mode.

Still another difference between the embodiment shown in table 4 and the other embodiments is that variable intake valve opening (VIO) is utilized in the first operating mode in the embodiment of table 4. The intake valve 3 is opened earlier than in the other operating modes for achieving long overlap with the exhaust valve 5. The intake valve 3 is opened for instance 10-30 degrees of crank angle earlier than in the other operating modes. With early intake valve opening, surging risk of the turbocharger can be lowered. Instead of VIO, variable exhaust valve closing (VEC) can be utilized for having variable scavenging period.

It will be appreciated by a person skilled in the art that the invention is not limited to the embodiments described above, but may vary within the scope of the appended claims. For instance, the fuel injection means can comprise two injectors instead of one injector having two nozzles. It is also possible that both fuel injection means are used when the engine is operated at high load. Different Miller cycles or inlet valve opening timings can be used in different operating modes. Although the operating modes are referred to with serial numbers, it is obvious that different combinations of the operating modes are possible. For instance, the method can comprise the first, second and fourth operating modes.

The invention claimed is:
1. A method for controlling the operation of an internal combustion engine, the engine comprising:
   at least one cylinder;
   a reciprocating piston arranged inside the cylinder;
   at least one intake valve arranged in connection with the cylinder;
   first fuel injection means;
   second fuel injection means optimized for injecting smaller amounts of fuel than the first fuel injection means; and
   means for variable intake valve closing,
   the method comprising at least two operating modes, wherein at a load that is at least 85 percent of the maximum load of the engine, the engine is operated in a first operating mode and in said first operating mode the intake valve is closed at a first predetermined crank angle, in accordance with a Miller cycle 15-70 degrees before bottom dead center for reducing pressure in the cylinder, and fuel is injected using the first fuel injection means, and wherein at a load that is at most 15 percent of the maximum load of the engine, the engine is operated in a second operating mode and in said second operating mode the intake valve is closed at a second predetermined crank angle, in accordance with conventional intake valve closing timing between 5 degrees before bottom dead center and 20 degrees after bottom dead center, and fuel is injected using the second fuel injection means.

2. The method according to claim 1, wherein the method comprises a third operating mode, in said third mode conventional intake valve closing timing is used and fuel is injected between 5 degrees before bottom dead center and 20 degrees after bottom dead center using the first fuel injection means.

3. The method according to claim 2, wherein the method comprises a fourth operating mode, in said fourth mode the Miller cycle is used and fuel is injected 15-70 degrees before bottom dead center using the second fuel injection means.

4. The method according to claim 3, wherein in the fourth operating mode later intake valve closing timing is used than in the first operating mode.

5. The method according to claim 4, wherein the intake valve is closed 5-15 degrees of crank angle later in the fourth operating mode.

6. The method according to claim 3, wherein the method comprises a fifth operating mode, in which mode the Miller cycle is used and the intake valve is closed 15-70 degrees before bottom dead center but later than in the first operating mode and fuel is injected using the first fuel injection means.

7. The method according to claim 6, wherein the intake valve is closed 5-15 degrees of crank angle later in the fifth operating mode.

8. The method according to claim 1, wherein in the first operating mode earlier intake valve opening timing is used than in the other operating modes.

9. The method according to claim 8, wherein in the first operating mode the intake valve is opened 10-30 degrees earlier than in the other operating modes.

10. The method according to claim 1, wherein the intake valve is closed 20-40 degrees of crank angle before bottom dead center.

11. The method according to claim 1, wherein fuel is injected using an injector comprising two needles.

12. An internal combustion engine comprising:
    at least one cylinder;
    a reciprocating piston arranged inside the cylinder;
    at least one intake valve arranged in connection with the cylinder;
    means for variable intake valve closing;
    first fuel injection means;
    second fuel injection means optimized for injecting smaller amounts of fuel than the first fuel injection means; and
    control means for controlling the valve closing means and the fuel injection means,
    wherein the control means is arranged to execute the method according to claim 1.

13. The internal combustion engine according to claim 12, wherein the engine comprises means for variable inlet opening.

* * * * *